(12) United States Patent
Chou et al.

(10) Patent No.: US 9,868,240 B2
(45) Date of Patent: Jan. 16, 2018

(54) SPUNBOND METHOD FOR PRODUCING NON-WOVEN FABRIC WITH DEODORANT FEATURE FROM BAMBOO CELLULOSE

(71) Applicant: Acelon Chemicals and Fiber Corporation, Changhua County (TW)

(72) Inventors: Wen-Tung Chou, Changhua County (TW); Ming-Yi Lai, Changhua County (TW); Kun-Shan Huang, Tainan (TW)

(73) Assignee: ACELON CHEMICALS AND FIBER CORPORATION, Changhua County (TW)

( * ) Notice: Subject to any disclaimer, the term of this patent is extended or adjusted under 35 U.S.C. 154(b) by 174 days.

(21) Appl. No.: 14/666,649

(22) Filed: Mar. 24, 2015

(65) Prior Publication Data
US 2016/0214302 A1 Jul. 28, 2016

(30) Foreign Application Priority Data
Jan. 26, 2015 (TW) .............................. 104102640 A

(51) Int. Cl.
*D01D 5/06* (2006.01)
*D01D 5/12* (2006.01)
(Continued)

(52) U.S. Cl.
CPC ........... *B29C 47/0004* (2013.01); *D01D 1/02* (2013.01); *D01F 1/10* (2013.01); *D01F 2/00* (2013.01);
(Continued)

(58) Field of Classification Search
CPC .. D01D 1/02; D01D 5/06; D01D 5/12; D01D 5/14; D01D 5/16; D01D 7/00;
(Continued)

(56) References Cited

U.S. PATENT DOCUMENTS 4,008,301 A 2/1977 Arisaka et al.
4,257,221 A 3/1981 Feinberg
(Continued)

FOREIGN PATENT DOCUMENTS

CN 103215753 A * 7/2013 ............... D01F 1/10

OTHER PUBLICATIONS

Machine translation of CN 103215753 a (published on Jul. 24, 2013).*

*Primary Examiner* — Leo B Tentoni
(74) *Attorney, Agent, or Firm* — Bacon & Thomas, PLLC

(57) ABSTRACT

A spunbond method for producing non-woven fabric with deodorant feature from bamboo cellulose comprises following process steps. Prepare bamboo pulp mixture by blending bamboo pulp and coffee residue in proper mixing ratio. Put N-methylmorpholine N-oxide (NMMO) as solvent and 1, 3-phenylene-bis 2-oxazoline (BOX) as stabilizer into prepared bamboo pulp mixture to form dope. Via spunbond method, orderly perform extruding, spinning, quenching and pre-drawing process to convert the dope into bamboo filaments of fibrous strand. Orderly process coagulation, regeneration and post-draw to the bamboo filaments of fibrous strand to transform them into uniform fine bamboo cellulose filaments. Bond and lay these bamboo filaments of fibrous strand on a belt collector to form a webbed nonwoven. After post treatments of water rinsing, hydro-entangled needle punching and drying have been orderly applied, then a resultant nonwoven fabric in continuous filament of bamboo cellulose with deodorant feature is produced from the webbed nonwoven.

12 Claims, 5 Drawing Sheets

(51) Int. Cl.
| | |
|---|---|
| *D01D 5/14* | (2006.01) |
| *D01D 5/16* | (2006.01) |
| *D01D 7/00* | (2006.01) |
| *D01D 10/00* | (2006.01) |
| *D01D 10/06* | (2006.01) |
| *D01F 2/02* | (2006.01) |
| *D01F 13/02* | (2006.01) |
| *D04H 3/013* | (2012.01) |
| *D04H 3/105* | (2012.01) |
| *D04H 3/11* | (2012.01) |
| *B29C 47/00* | (2006.01) |
| *D01D 1/02* | (2006.01) |
| *D01F 1/10* | (2006.01) |
| *D01F 2/00* | (2006.01) |
| *B29L 7/00* | (2006.01) |
| *B29K 1/00* | (2006.01) |
| *B29K 311/10* | (2006.01) |
| *B29C 47/36* | (2006.01) |

(52) U.S. Cl.
CPC ........ *B29C 47/0014* (2013.01); *B29C 47/367* (2013.01); *B29K 2001/00* (2013.01); *B29K 2001/08* (2013.01); *B29K 2311/10* (2013.01); *B29L 2007/002* (2013.01)

(58) Field of Classification Search
CPC .......... D01D 10/00; D01D 10/06; D01F 1/10; D01F 2/02; D01F 13/02; D04H 3/013; D04H 3/105; D04H 3/11
USPC ........ 264/37.18, 37.2, 37.24, 103, 187, 203, 264/210.8, 211.12, 211.14, 211.15, 232, 264/233, 234; 28/104, 107
See application file for complete search history.

(56) References Cited

U.S. PATENT DOCUMENTS

| | | |
|---|---|---|
| 4,466,990 A | 8/1984 | Sakurada et al. |
| 4,946,811 A | 8/1990 | Tuovinen et al. |
| 2011/0156303 A1* | 6/2011 | Chou ...................... D01D 5/06 264/183 |
| 2012/0031416 A1* | 2/2012 | Atchley .................. D01F 2/00 131/354 |

* cited by examiner

US 9,868,240 B2

SPUNBOND METHOD FOR PRODUCING NON-WOVEN FABRIC WITH DEODORANT FEATURE FROM BAMBOO CELLULOSE

FIELD OF THE PRESENT INVENTION

The present invention relates to a spunbond method for producing non-woven fabric with deodorant feature from bamboo cellulose particularly for one regarding bamboo pulp with eco-friendly biodegradable feature. The spunbond non-woven of bamboo cellulose produced by the present invention in filament manner do really has effect in deodorant capability with excellent degree of air permeability and rate of water absorption so that it can be used in textile, medical or health-care and bioscience fields as well as wafer-cleaning in semiconductor.

BACKGROUND OF THE INVENTION

Currently, for raw materials used in producing nonwoven from chemical synthetic fiber, the consumption is polypropylene (PP), polyester (PET), polyethylene (PE) and Nylon in quantity order with overall consumed quantity 96%. However, the wasted fabric of non-woven from chemical synthetic fiber after having been used incurs a malignant impact to the environment because they are un-biodegradable by natural environment. Nowadays, the manufacturers of the natural cellulose fabric gradually divert to use natural materials such as pulp with suitable solution become a mainstream to substitute for raw materials of non-woven from chemical synthetic fiber so that it is so called as eco-friendly fiber or Lyocell fiber as the wasted fabric thereof is biodegradable. Basing on the article in title of "The technological development and application for bamboo charcoal used in textile" publicized by the domestic "Forestry Research Institute in the Council of Agriculture" and research thesis in title of "new regenerated cellulose fiber—bamboo fiber" publicized in the issue 2 of year 2003 of "scientific and technical journals/periodicals" by the "Shandong Province Textile Industry Association" in the Mainland China, it testifies that the bamboo fiber intrinsically has enhanced antiseptic, moisture-absorbing, air-permeating, deodorant and negative-ion health-care features. Moreover, bamboo belong to rapid-growing plant having strong fertility with crop rate to cut down in 2-3 year span and good recycling resource with re-cultivating easiness without any severe ecological destruction to the forest land, which usually happened in cutting down of the timber. Besides, the cost of the bamboo pulp is only one third in the cost of the wood pulp. Therefore, the productions of bamboo fiber by means of solvent means in Lyocell fiber process have been publicized in many patent documents such as Mainland China Invention Patent in Patent Numbers of CN1129680, CN1190531, CN1315624 and CN100395384. However, the common drawback for the bamboo cellulose in foregoing Mainland China Invention Patents is lack of deodorant feature and effect on the basis of disclosed specifications thereof. According to statistical information from the "Tariff Bureau of the Ministry of Finance in Taiwan", it displays that the annual overall imported quantity of the fresh coffee beans in year 2011 is 17,685 metric tons. The annual overall quantity of wasted coffee residue for the imported fresh coffee beans after it having baked and spent is over 8,842 metric tons suppose the ratio of the wasted coffee residue to the fresh coffee beans is ½ normally. So far, most portion of the wasted coffee residue in 8,842 metric tons is disposed by incineration or being buried under ground while only few portions is used as deodorant, nutrition of the plants or cleaning additive. Besides, someone take the wasted coffee residue to fabricate a coffee yarn product such as Mainland China Invention Patent in Patent Number of CN 1338729, which discloses the process as following.

(a): By selecting raw material from polypropylene (PP), polyester (PET), polyethylene (PE) and Nylon to prepare high polymer granules;

(b): By using wasted coffee residue to serve as property modifier;

(c): By blending foregoing high polymer granules and wasted coffee residue to become granular additive masterbatch; and (d): Spin the granular additive masterbatch into yarns.

The drawback of the foregoing coffee yarn product is that it still incurs a malignant impact to the environment because they are un-biodegradable by natural environment since the high polymer granules also selected from polypropylene (PP), polyester (PET), polyethylene (PE) and Nylon, each of which intrinsically belongs to polymers respectively. Other than the wasted coffee residue in 8,842 metric tons mentioned above, there are bamboo forests of 15 hectares area, which is approximately 7.2% of overall tree forest area, in Taiwan too. Having realized foregoing issues, the applicant of the present invention take a long time hard study to perform penetrating and profound research and development in how to take advantages of the biodegradable feature in the bamboo fiber and the deodorant feature in the wasted coffee residue as well as how to integrate these favorable features into a contemplated ideal natural cellulose fiber being able in mass production and competitive marketability. Accordingly, two inventions related are worked out successively and two patents thereof in the Republic of China (R.O.C.) are granted respectively, which are patent A in title of "Processing method of natural cellulose fiber intrinsically with enhanced antiseptic, deodorant and negative-ion features from bamboo" with Patent Number of 102110616 and Publication Number of 201437444, as well as patent B in title of "Processing method of non-woven intrinsically with enhanced deodorant feature from bamboo" with Patent Number of 102110620 and Publication Number of 201437449. However, the same applicant proceeds to further develop innovative technology. Eventually, an expected "spunbond method for producing nonwoven fabric with deodorant feature from bamboo cellulose" of the present invention is worked out successfully after many times of experimental tests in trial implements.

SUMMARY OF THE INVENTION

The primary object of the present invention is to provide a spunbond method for producing non-woven fabric with deodorant feature from bamboo cellulose comprising following process steps: firstly, prepare bamboo pulp mixture by blending bamboo pulp and coffee residue in proper mixing ratio; secondly, put N-methylmorpholine N-oxide (NMMO) as solvent and 1, 3-phenylene-bis 2-oxazoline (BOX) as stabilizer into prepared bamboo pulp mixture to form dope; thirdly, via spunbond method, orderly perform extruding, spinning, quenching and pre-drawing process to convert the dope into bamboo filaments of fibrous strand; fourthly, orderly process coagulation, regeneration and post-draw to the bamboo filaments of fibrous strand to transform them into uniform fine bamboo cellulose filaments; fifthly, bond and lay these bamboo filaments of fibrous strand on a belt collector to form a webbed nonwoven; and finally, after post treatments of water rinsing, hydro-entangled needle punching and drying have been orderly applied, then a resultant nonwoven fabric in continuous filament of bamboo cellulose with deodorant feature is produced from the webbed nonwoven. Because no popular bleaching process is involved for the dope, which is used in producing bamboo filaments in the spunbond method of the present invention, the raw material of bamboo pulp can be selected from group with low degree of polymerization (DP) so that overall manufacturing cost is substantially reduced.

The other object of the present invention is to provide a spunbond method for producing non-woven fabric with deodorant feature from bamboo cellulose, wherein the non-toxic N-methylmorpholine N-oxide (NMMO) is used as primary solvent, which is not only used in overall process but also fully recycled and recovered into fresh manner for reuse. By combination the raw materials of the wasted coffee residue with eco-friendly biodegradable feature and the bamboo pulp with deodorant feature, the non-woven produced by the present invention in filament manner do really has effect in deodorant capability with excellent degree of air permeability and rate of water absorption so that it will not create any harmful effect to the environment either during manufacturing process or becoming wasted disposal after usage.

DETAILED DESCRIPTION OF THE PREFERRED EMBODIMENTS

Figure 1:
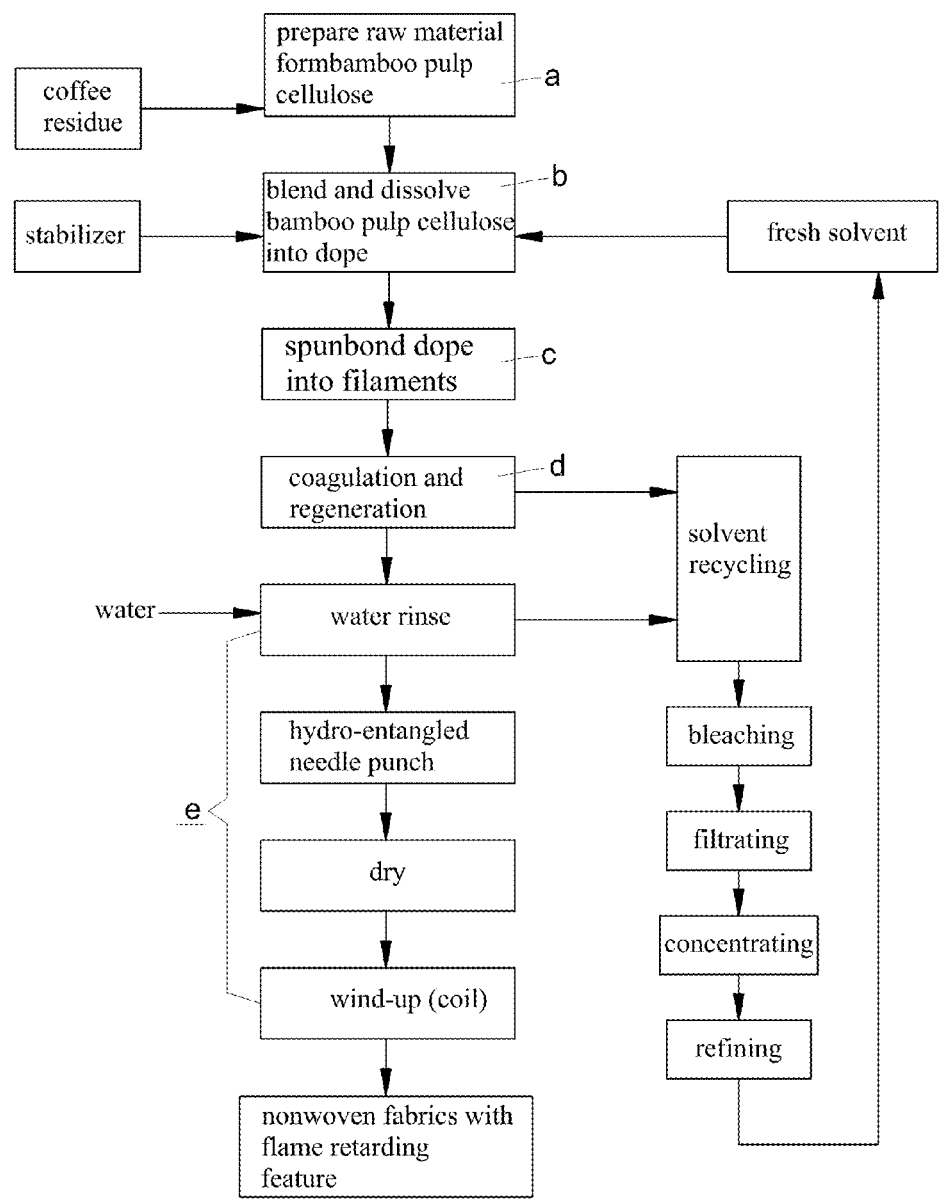
FIG. 1 is a flow chart schematic view showing fabricating process for overall spunbond method of the present invention.
Figure 2:
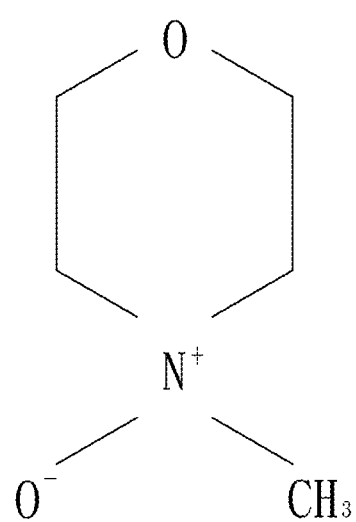
FIG. 2 is a chemical structure of the N-methylmorpholine N-oxide (NMMO) solvent used in the present invention.
Figure 3:
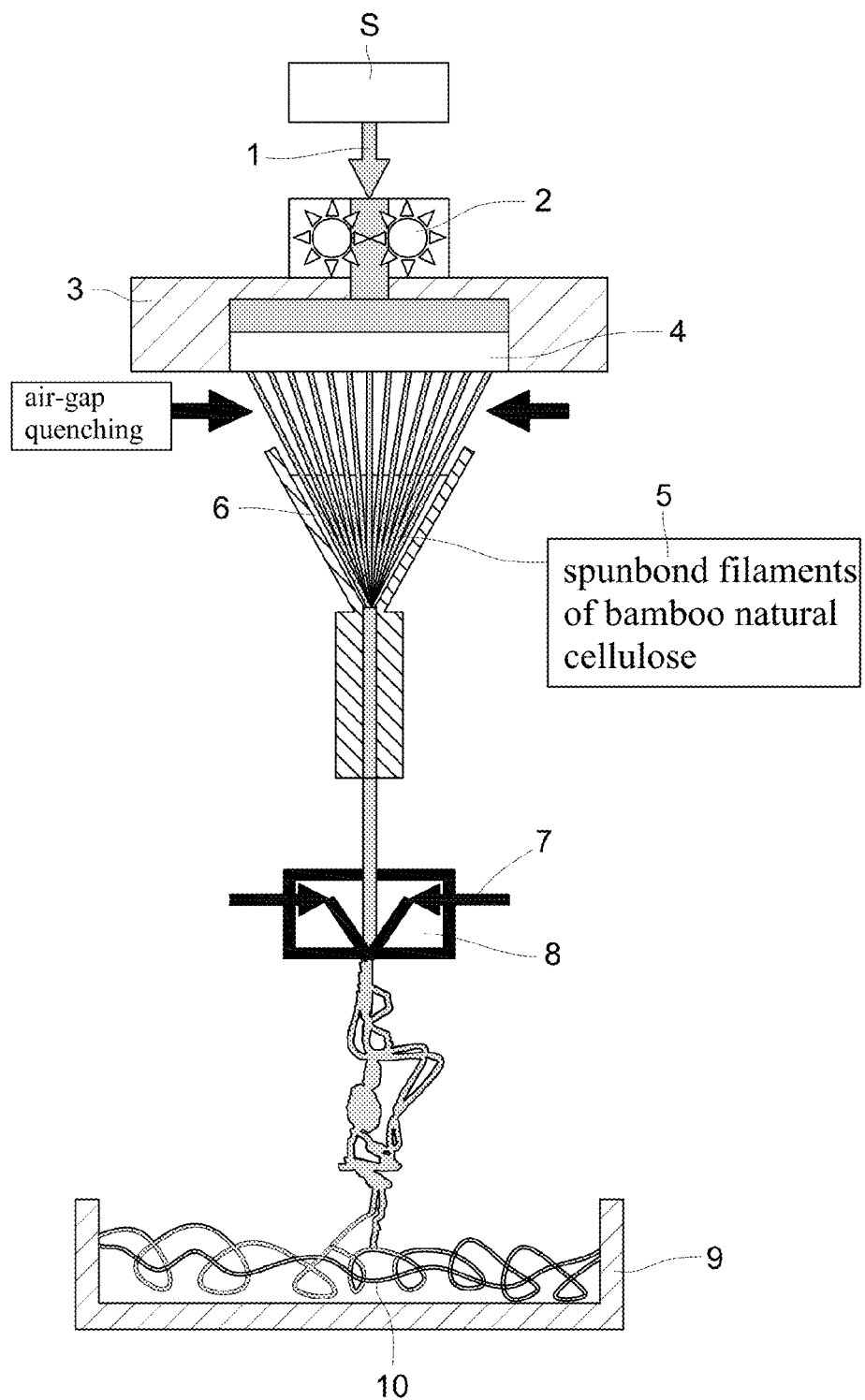
FIG. 3 is an operational view for a spunbond filament strand of natural bamboo cellulose in the present invention.
Figure 4:
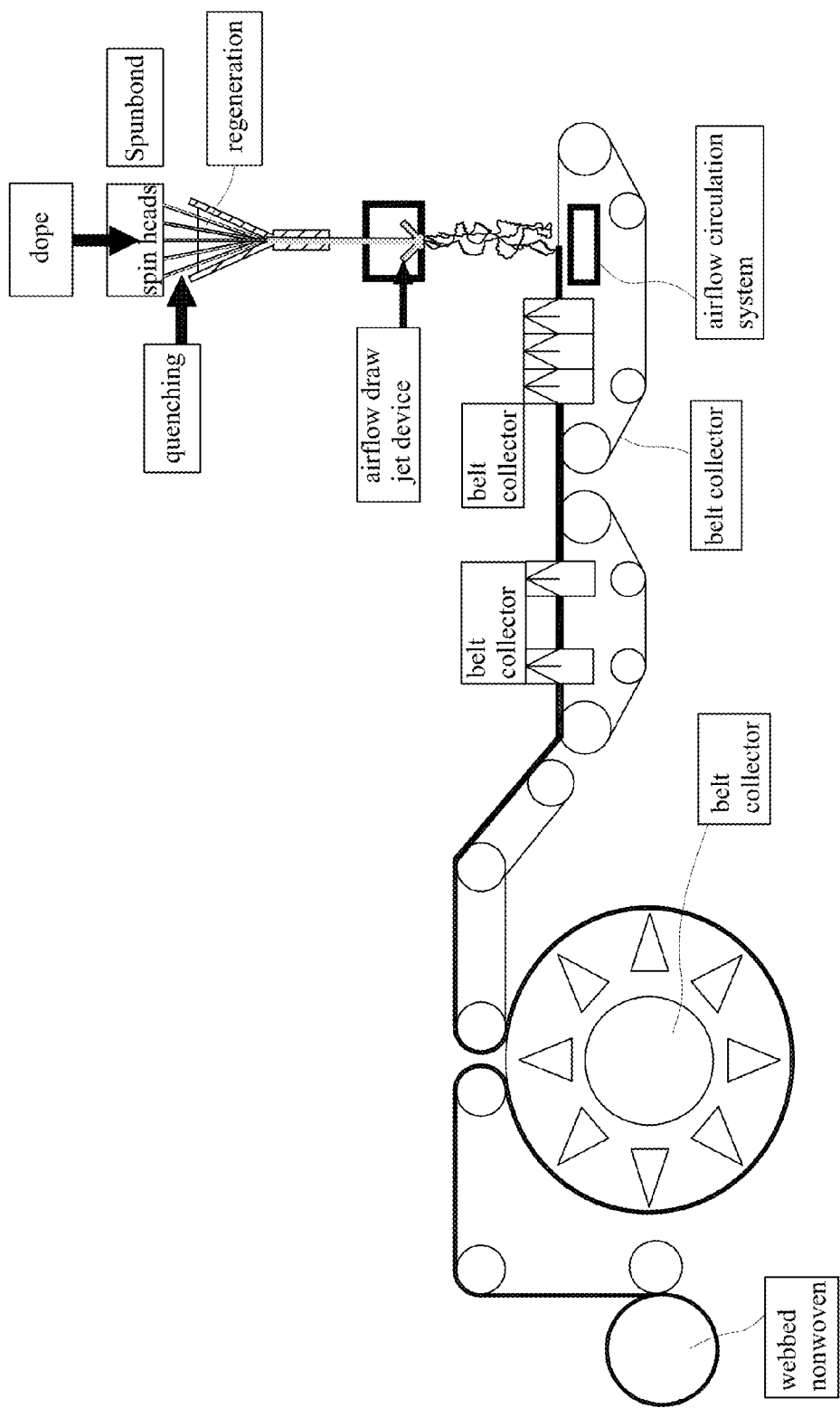
FIG. 4 is a diagrammatical configuration showing facilities with fabricating process for overall spunbond method of the present invention.
Figure 5:
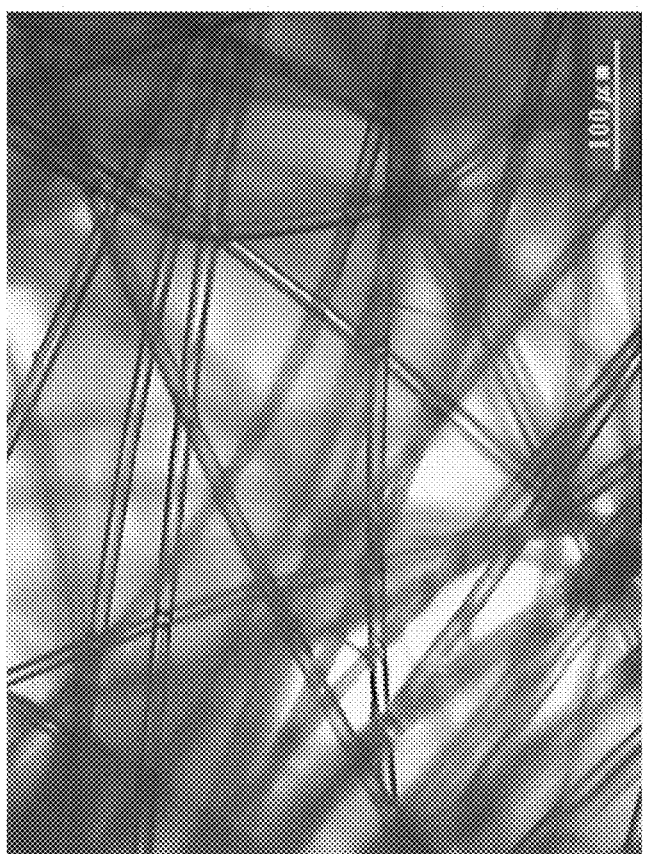
FIG. 5 is an enlarged schematic view with 1000 times of magnification by an electron microscope showing a nonwoven fabric with deodorant feature produced from natural cellulose of bamboo pulp for the present invention.

For further manifesting procedures in fabricating the present invention, some exemplary preferred embodiments are described below with associated drawing figures. Please refer to FIGS. 1 through 5. The "spunbond method for producing non-woven fabric with deodorant feature from bamboo cellulose" comprises following process steps:

a. Select bamboo pulp and wasted coffee residue as raw material to blend together mutually into a mixture, preferably the cellulose content of the bamboo pulp being over 50% and the range for degree of polymerization (DP) being 350-750 while the wasted coffee residue having been ground into range of 500-900 nm (nano-meter) granules in high speed mode;

b. By putting N-methylmorpholine N-oxide (NMMO), whose chemical structure as shown in FIG. 2, as primary dissolving solvent and 1,3-phenylene-bis 2-oxazoline (BOX) as additive stabilizer into prepared bamboo pulp mixture obtained from previous step a for blending and dissolving under low temperature in range of 50-70 degree centigrade (50-70° C.) via rapid grinding of a horizontal dope blending machine; and, by means of cellulose features of high expanding, moistening and dissolving ability as well as high rate of dissolving speed affected by the N-methylmorpholine N-oxide (NMMO) to expedite mutually blending and dissolving effect for forming a slurry; then, dehydrate it via heating up to temperature in range of 80-130 degree centigrade (80-130° C.) by vacuum thin film evaporator (TFE) for 5 minutes to decrease water content thereof in range down to 5-13% so that a homogenized mucilaginous dope 1 is formed c. Via spunbond method, the dope 1 is firstly fed into and extruded out of an extruder S, henceforth the dope 1 is fed into a spin-pack 3 and forcedly spun out of spin nozzles (or spinnerets, spin head) 4 by means of a gear pump 2 as shown in FIG. 3, afterward external compressed quenching air is continuously blown through for cooling and preliminarily drawing the dope 1 for converting it into bamboo cellulose filaments by means of air gap, latterly draw the bamboo cellulose filaments by an airflow draw jet device or airflow draw stretcher to become bamboo filaments of fibrous strand 5, wherein the ranges for distance of the air gap, temperature and relative humidity of the quenching air are 2-30 cm, 5-35 degrees centigrade (5-35° C.) and 60-90% respectively;

d. Coagulate and regenerate the bamboo filaments of fibrous strand 5 in a coagulating liquid 6, next draw the bamboo filaments of fibrous strand 5 by an airflow draw jet device (or airflow draw stretcher) 8 with drawing speed thereof in range of 20-3000 m/min to become uniform fine bamboo cellulose filaments, then bond and lay these bamboo filaments of fibrous strand 5 on a belt collector 9 to form a webbed nonwoven 10 as shown in FIG. 3, wherein the ranges for temperature of the coagulating liquid 6 and concentration for existing N-methylmorpholine N-oxide (NMMO) of dissolving solvent are 5-30 degrees centigrade (5-30° C.) and 0-30 wt % respectively; and e. After post treatments of water rinsing, hydro-entangled needle punching and drying have been orderly applied (as shown in FIG. 4), then a resultant nonwoven fabric in continuous filament of bamboo cellulose with deodorant feature is produced from the webbed nonwoven 10 (as shown in FIG. 5).

Wherein, the weight content of the wasted coffee residue in the prepared bamboo pulp mixture of step a is in range of 0.5-5 wt %.

And, additive stabilizer 1, 3-phenylene-bis 2-oxazoline (BOX) in above step b functions to subdue the declining recession for the color and degree of polymerization (DP) of bamboo cellulose. Whereas, the primary dissolving solvent N-methylmorpholine N-oxide (NMMO) in above steps b is nontoxic with concentration range of 45-75% so that it is recycled with low consumption rate after having been drained out in water rinse process with a range for rate of recovery up to over 99.7%. Thereby, it completely complies with the eco-friendly criteria of the environmental protection because it not only can reduce the manufacturing cost but also will not incur any harmful pollution to the environment.

Moreover, for the dope in above step b, the content percentage of cellulose thereof is in range of 6-5 wt %, the viscosity thereof is in range of 1000-3000 poise, the light transmittance index thereof is in range of 1.470-1.495, and the melting Index thereof is in range of 100-500.

Besides, for the non-woven fabric of bamboo cellulose in above step d, the winding speed in the winding process thereof is in range of 2-300 meter per minute, the range on basis weight thereof is 10-300 g/m2, the fineness (or fiber number) for fiber thereof is in range of 1-30 um, the strength in machine direction (MD) thereof is over 20 kgf while the strength in cross direction (CD) thereof is over 12 kgf, and the degree of air permeability thereof is in range of 100-3500 (cm3/cm2/min) while the degree of water absorption thereof is in range of 500-2000%.

Furthermore, the solvent recycling process of N-methylmorpholine N-oxide (NMMO), which is used in steps d and e, comprises following steps:

1. Bleaching:

The bleaching process of the present invention is performed by absorption of suspending active carbon with practical steps as below: put active carbon powder with good absorptivity and suspension ability in percentage range of 0.05-0.10% into the liquid of N-methylmorpholine N-oxide (NMMO) solvent to be de-colored, then alternate the air-blast mixing with absorption and the stationary suspending absorption treatments with treating time ratio in range between 1:3 to 1:6 for over 8 hours to finish the bleaching procedure so that the advantages of the decolorizing process of the present invention have effects in simplifying process facilities, saving energy and enhancing effect of absorbing decolorization;

2. Filtrating:

The filtrating process of the present invention is performed by bi-phase filtration of coarse filtering phase and fine filtering phase. First coarse filtering phase: for simplifying the processing facility, general cartridge filter is used with filter aid composing of diatomite and cellulose preferably made of diatomite to cellulose in ratio of 4:1. In order to avoid hindering filtrating speed incurred by active carbon from gradually accumulating on the surface of the filtering cartridge, a filter aid not only spreads over the surface of the filtering cartridge but also is put in the solution to be filtrated with content thereof in percentage range between 0.03-0.05%. Besides, minor puffing agent is also mixed therein to enhance filtrating speed without degeneracy. After completion of the coarse filtering phase, the filtering dregs and the residual liquid are centrifugal and dehydrating treated for recycling use so that the residual auxiliary filtering agent of dehydrated filter aid can be reused as auxiliary filtering effect being remained. Second fine filtering phase: Ultrafiltration (UF) filter is used so that the cleanness of the filtrated liquid is the same as that of the fresh solvent. The advantages of the bi-phase filtrating process of the present invention are low cost of process facilities, low ratio of consumption rate, high throughput and high cleanness;

3. Concentrating:

In recovering the water rinsing liquid in the present invention, the condensing load in dehydration is very large in manner of approximately 90 tons per ton of fiber as solvent concentration must be condensed from in percentage range between 6.5-8.0% down to in percentage range between 50-55%. For low yield quantity of fiber, a tri-effect condensing method is adopted to dehydrate per ton of rinsing liquid in using 0.5 ton of steam (high steam consumption but low electric power consumption) while for high yield quantity of fiber, a Mechanical Vapor Recompression (MVR) condensing method is adopted to dehydrate per ton of rinsing liquid in using quantity range between 0.003-0.03 ton of steam (low steam consumption but high electric power consumption). The yield condensed liquid with solvent and condensed water in both foregoing condensing methods can also be completely recovered for reusing though each condensing method is only suitable for different specific yield quantity of fiber. Wherein, the yield condensed liquid with solvent can be recycled for reusing as processing solvent and yield condensed water can be recycled for reusing to rinse fiber; and 4. Refining:

Adopting temperature at 80 degree centigrade (80° C.) low temperature oxidation and neutralizing reduction. Using percentage concentration in 35% of hydrogen peroxide (H.sub.2.O.sub.2. or $H_2O_2$) as oxidant and percentage concentration in 85% of hydrazine hydrate (N.sub.2.H.sub.4.H.sub.2.O or $N_2H_4H_2O$) as neutralizing reductant, the result is measured by electric potential titrating method. The NMMO content can be decreased down below 10 ppm so that not only the purity of NMMO can be promoted but also the NMMO consumption can be decreased.

For expedite you to further understand the features and efficacy of the present invention, various item tests for the exemplary embodiments are described in detail as below.

Embodiment 1( Samples in Number 1-10 for the Present Invention)

Initially, put wasted coffee residue into selected bamboo pulp with degree of polymerization (DP) in range of 400-800 to mutually blend together with primary dissolving solvent N-methylmorpholine N-oxide (NMMO) and various additive ratios of stabilizer 1, 3-phenylene-bis 2-oxazoline (BOX) to form a slurry via blending, dissolving and rapid grinding processes under temperature in range of 50-70 degree centigrade (50-70° C.). Then, dehydrate it via heating up to temperature in range of 80-130 degree of Celsius (80-130° C.) by vacuum thin film evaporator (TFE) for 5 minutes to decrease water content thereof down to range of 5-13% so that a homogenized mucilaginous dope is formed; subsequently, via spunbond method, the dope is firstly fed into and extruded out of an extruder, henceforth the dope is fed into a spin-pack and forcedly spun out of spin nozzles by means of a gear pump, afterward external compressed quenching air is continuously blown through for cooling and preliminarily drawing the dope for converting it into bamboo cellulose filaments by means of air gap, latterly draw the bamboo cellulose filaments by an airflow draw jet device or airflow draw stretcher to become bamboo filaments of fibrous strand; successively, coagulate and regenerate the bamboo filaments of fibrous strand in a coagulating liquid, next draw the bamboo filaments of fibrous strand by an airflow draw jet device to become uniform fine bamboo cellulose filaments, then bond and lay these bamboo filaments of fibrous strand on a belt collector to form a webbed nonwoven; and finally, after post treatments of water rinsing, bleaching, water rinse, drying and winding-up have been orderly applied, then final product for nonwoven fabrics of continuous filament are produced from bamboo cellulose. The compositions of various dopes from bamboo cellulose for samples 1 through 10 are shown in table 1.

TABLE 1

Composition of dope from bamboo cellulose for samples 1 through 10

| SU | DP in BC nil | AR of AR wt % | DR for DP % | CP of CL % | CP of SV % | CP of WT % | VC of DP poise | LTI Of DP nil | MI Of DP |
|---|---|---|---|---|---|---|---|---|---|
| 1 | 350 | 0.05% | 26.4 | 10.2 | 82.3 | 7.5 | 6820 | 1.488 | 380 |
| 2 | 350 | 0.10% | 23.5 | 11.1 | 81.8 | 7.1 | 6920 | 1.487 | 360 |
| 3 | 350 | 0.15% | 17.9 | 11.9 | 81.8 | 6.3 | 7040 | 1.487 | 350 |
| 4 | 350 | 0.20% | 14.8 | 11.5 | 81.3 | 7.2 | 6980 | 1.492 | 420 |
| 5 | 350 | 0.25% | 14.5 | 11.2 | 81.5 | 7.5 | 6960 | 1.485 | 410 |
| 6 | 750 | 0.05% | 26.6 | 10.4 | 81.9 | 7.7 | 7140 | 1.487 | 360 |
| 7 | 750 | 0.10% | 23.1 | 11.5 | 81.6 | 6.9 | 7460 | 1.485 | 380 |
| 8 | 750 | 0.15% | 18.9 | 12.4 | 82.8 | 6.8 | 7620 | 1.488 | 200 |
| 9 | 750 | 0.20% | 15.9 | 11.1 | 82.5 | 6.4 | 7180 | 1.485 | 340 |
| 10 | 750 | 0.25% | 14.7 | 10.8 | 81.4 | 7.8 | 7220 | 1.487 | 310 |

Notation
S = sample
U = unit
DP in BC = degree of polymerization in bamboo cellulose
AR of AR = additive ratio of anti-recession stabilizer for DP
DR for DP = decay rate for degree of polymerization
CP of CL = content percentage of cellulose
CP of SV = content percentage of solvent
CP of WT = content percentage of water
VC of DP = viscosity of dope
LTI of DP = light transmittance index of dope
MI of DP = melting index of dope Embodiment 2(Samples in Number 11-20 for the Present Invention)

Subsequently, perform strength test of nonwoven for samples 11 through 20, which are prepared into different basis weights for spunbond nonwoven of bamboo cellulose in accordance with respective degree of polymerization (DP) and additive ratio of anti-recession stabilizer for DP shown in TABLE 1, by criteria of CNS5610 with following procedure.

1. Specimen Preparation:

Respectively obtain 10 pieces of specimens for each cross direction (CD) and mechanical direction or machine direction (MD) with specimen length being over 180 mm and specimen width being 2.54 mm.

2. Strength Testing Method:

By using universal strength testing machine with holding width for specimen holding jaws of testing fixture being set 76 mm under crosshead speed for extension test being set 300 mm/min, respectively perform strength test for each of 10 testing specimens.

3. Testing Results:

Respective strengths of nonwoven for samples 11 through 20 of nonwoven are listed in following TABLE 2.

TABLE 2

Properties of dope from bamboo cellulose for samples 11 through 20

| S U | DP in BC nil | AR of AR wt % | BW of NW g/m² | SMD of NW kgf | SCD of NW kgf | FN of FB μm |
|---|---|---|---|---|---|---|
| 11 | 350 | 0.05% | 74 | 20.1 | 12.3 | 15.2 |
| 12 | 350 | 0.10% | 75 | 20.5 | 12.9 | 14.8 |
| 13 | 350 | 0.15% | 74 | 20.9 | 12.1 | 14.7 |
| 14 | 350 | 0.20% | 75 | 21.1 | 12.8 | 14.8 |
| 15 | 350 | 0.25% | 75 | 21.2 | 12.9 | 14.9 |
| 16 | 750 | 0.05% | 74 | 21.3 | 12.5 | 15.3 |
| 17 | 750 | 0.10% | 74 | 21.5 | 12.5 | 14.8 |
| 18 | 750 | 0.15% | 75 | 21.5 | 12.7 | 15.1 |
| 19 | 750 | 0.20% | 75 | 21.7 | 12.8 | 14.7 |
| 20 | 750 | 0.25% | 74 | 21.8 | 13.1 | 15.2 |

Notation
S = sample
U = unit
DP = degree of polymerization
AR of AR = additive ratio of anti-recession stabilizer for DP
BW of NW = basis weight of nonwoven
SMD of NW = strength in machine direction of nonwoven
SCD of NW = strength in cross direction of nonwoven
FN of FB = fineness (or fiber number) of fiber Embodiment 3(Samples in Number 21-32 for the Present Invention)

Now, perform air permeability test and water absorption test for samples 21 through 32, which are prepared in accordance with respective degree of polymerization (DP) and basis weights of nonwoven, by criteria of CNS5612 with following procedure.

1. Air Permeability Test:

Respectively obtain 4 pieces of specimens with specimen dimension being 26×26 cm2 for each sample. By using Textest FX 3300 Air Permeability Tester, respectively perform test for each of 12 specimens 21 through 32.

2. Water Absorption Test:

Respectively obtain 5 longitudinal pieces of specimens with specimen width being 76 mm, specimen weight being 5.0±0.1 g and specimen length being determined in accordance with the specimen weight. For testing procedure of water absorption test: firstly, put each specimen in a holding basket, and then dunk the holding basket with specimens in water in totally immersion manner for 10 seconds; secondly, lift the holding basket with specimens out of the water to drip water for 10 seconds; and finally, put the holding basket with specimens into a measuring glass of known weight to measure overall gross weight with 0.1 g precision.

The degree/rate of water absorption for specimen is calculated by following formula:

$$\text{Rate/degree of Water Absorption:} RA_W \ (\%) = \frac{[W_A(g) - W_D(g)]}{W_D \ (g)} \times 100$$

Where, $RA_W$ denotes to rate of water absorption for each specimen while $W_D$ denotes to specimen dry weight before dunking in water, and $W_A$ denotes to specimen wet weight after dunking in water.

3. Testing Results:

Respective rates of air permeability and rates of water absorption for samples 21 through 32 of nonwoven are listed in following TABLE 3.

TABLE 3

Properties of dope from bamboo cellulose for samples 21 through 32

| S U | DP in BC nil | BW of NW g/m² | FN of FB μm | DAP for NW kgf | RWA for NW kgf |
|---|---|---|---|---|---|
| 21 | 350 | 25 | 14.1 | 2880 | 500 |
| 22 | 350 | 75 | 14.6 | 965 | 580 |
| 23 | 350 | 125 | 14.8 | 348 | 750 |
| 24 | 350 | 175 | 14.4 | 277 | 850 |
| 25 | 350 | 225 | 14.6 | 162 | 920 |
| 26 | 350 | 300 | 14.2 | 159 | 1250 |
| 27 | 750 | 25 | 14.2 | 2980 | 525 |
| 28 | 750 | 75 | 14.6 | 850 | 590 |
| 29 | 750 | 125 | 15.0 | 350 | 750 |
| 30 | 750 | 175 | 14.9 | 268 | 860 |
| 31 | 750 | 225 | 15.2 | 174 | 910 |
| 32 | 750 | 300 | 14.8 | 156 | 1260 |

Notation
S = sample
U = unit
DP = degree of polymerization
BW of NW = basis weight of nonwoven
FN of FB = fineness (or fiber number) of fiber
DAP for NW = degree of air permeability for nonwoven
RWA for NW = rate of water absorption for nonwoven Embodiment 4(Samples in Number 33-44 for the Present Invention)

1. Specimen Preparation:

Respectively obtain 12 specimens for samples 33 through 44 for spunbond nonwoven of bamboo cellulose by various added rates of degree of polymerization (DP) and wasted coffee into spinning dope for testing and assessing deodorant effect.

2. Deodorant Testing Method:

The test for evaluating deodorant effect is based on absorption of the ammonia odor. The testing method is performed in following steps.

Step 1: fill the ammonia gas of specific concentration into the air-tight bottle;

Step 2: put the sample of bamboo cellulose fiber for the present invention in specific quantity into the same bottle aforesaid; and Step 3: measure the gas concentration in the sample of bamboo cellulose fiber before and after putting into the bottle by gas chromatograph (GC).

The ratio of the deodorant property (DOP) for ammonia absorption rate test is calculated by following formula.

(DOP) for test on rate of ammonia absorption:
$$DOP=(Ca-Cr)/Ca$$

Where, Ca is the gas concentration in the sample fiber before absorbing ammonia while Cr is the gas concentration in the sample fiber after absorbing ammonia.

3. Testing Results:

Respective rates of ammonia absorption for samples 33 through 44 of nonwoven are listed in following TABLE 4.

TABLE 4

Deodorant capability test of spunbond non-woven from bamboo cellulose fiber

| S U | DP in BC nil | Added ratio of coffee residue wt % | Rate of Ammonia absorption % | Testing Results Yes/No |
|---|---|---|---|---|
| 33 | 350 | 0.5 | 52.8 | Yes |
| 34 | 350 | 1.0 | 57.8 | Yes |
| 35 | 350 | 1.5 | 58.5 | Yes |
| 36 | 350 | 2.0 | 64.7 | Yes |
| 37 | 350 | 2.5 | 63.9 | Yes |
| 38 | 350 | 3.0 | 68.3 | Yes |
| 39 | 750 | 0.5 | 56.9 | Yes |
| 40 | 750 | 1.0 | 58.5 | Yes |
| 41 | 750 | 1.5 | 60.1 | Yes |
| 42 | 750 | 2.0 | 63.2 | Yes |
| 43 | 750 | 2.5 | 64.1 | Yes |
| 44 | 750 | 3.0 | 65.3 | Yes |

Notation
S = sample
U = unit
DP = degree of polymerization
BW of NW = basis weight of nonwoven
FN of FB = fineness (or fiber number) of fiber
DAP for NW = degree of air permeability for nonwoven
DWA for NW = degree of water absorption for nonwoven As demonstrated by the samples 11 through 20 in the TABLE 2 and samples 21 through 32 in the TABLE 3, the spunbond nonwoven fabric produced from natural bamboo cellulose by the present invention features very ideal strength either in mechanical direction (MD) or cross direction (CD) as well as better rate/degree of air permeability and rate/degree of water absorption for spunbond nonwoven of bamboo cellulose than those of conventional nonwoven produced either from chemical synthetic fiber or conventional natural fiber. Moreover, as verified by the samples 33 through 44 in the Table 4 presented above, the spunbond nonwoven fabric produced from natural bamboo cellulose by the present invention has excellent deodorant capability due to containing wasted coffee residue so that it meet medical and industrial application requirements such as apparels, sanitary and medical materials, filtrating materials, wiping materials for biomedical and optoelectronic wafers and the like. In conclusion of disclosure heretofore, the present invention not only has advantages in eco-friendly feature due to biodegradability of natural bamboo cellulose but also has advantages in deodorant feature due to nature of wasted coffee residue. Accordingly, the present invention becomes an environment protective process with novelty and practical usage, which meet the criterion of patentability. Therefore, we submit the patent application in accordance with related patent law.

What is claimed is:

1. A spunbond method for producing non-woven fabric with deodorant feature from bamboo cellulose comprises the following process steps:

a. selecting bamboo pulp and wasted coffee residue as raw materials to blend together mutually into a bamboo pulp mixture, wherein a cellulose content of the bamboo pulp is over 50% and a range for degree of polymerization (DP) is 350-750, and said wasted coffee residue having been ground into a size range of 500-900 nm granules in high speed mode;

b. putting N-methylmorpholine N-oxide (NMMO) as a primary dissolving solvent and 1,3-phenylene-bis 2-oxazoline (BOX) as an additive stabilizer into the bamboo pulp mixture for blending and dissolving under low temperature in a range of 50-70 degree centigrade (50-70° C.) via rapid grinding using a horizontal dope blending machine; and, by means of cellulose features of high expanding, moistening and dissolving ability as well as high rate of dissolving speed affected by the NMMO to expedite a mutually blending and dissolving effect for forming a slurry; then, dehydrating the slurry via heating up to a temperature in a range of 80-100 degree centigrade (80-100° C.) using a vacuum thin film evaporator (TFE) for 5 minutes to decrease a water content thereof to an range down to 5-13% so that a homogenized mucilaginous dope is formed;

c. via a spunbond method, the mucilaginous dope is firstly fed into and extruded out of an extruder, henceforth the mucilaginous dope is fed into a spin-pack and forcedly spun out of spin nozzles by means of a gear pump, afterward external compressed quenching air is continuously blown through for cooling and preliminarily drawing the mucilaginous dope for converting the mucilaginous dope into bamboo cellulose filaments by means of an air gap by latterly drawing the bamboo cellulose filaments using an airflow draw jet device to become bamboo filaments of fibrous strand, wherein the ranges for distance of the air gap, temperature and relative humidity of the quenching air are 2-30 cm, 5-35 degrees centigrade (5-35° C.) and 60-90% respectively;

d. coagulating and regenerating the bamboo filaments of fibrous strand in a coagulating liquid, by drawing the bamboo filaments of fibrous strand using the airflow draw jet device with drawing speed thereof in a range of 20-3000 m/min to become uniform fine bamboo cellulose filaments, then bonding and laying said bamboo filaments of fibrous strand on a belt collector to form a webbed nonwoven wherein the ranges for temperature of the coagulating liquid and concentration for existing NMMO of dissolving solvent are 5-30 degrees centigrade (5-30° C.) and 0-30 wt % respectively; and e. in after post treatments of water rinsing, orderly applying hydro-entangled needle punching and drying, wherein a resultant nonwoven fabric having continuous filament of bamboo cellulose with deodorant feature is produced from the webbed nonwoven, wherein the viscosity of cellulose for the dope in step b is in range of 6800-7600 poise, wherein the non-woven fabric of bamboo cellulose in above step d, a fineness (or fiber number) for fiber in range of 15-30 μm, and wherein the resultant nonwoven fabric has a deodorant capability of absorbing between 52.8 and 68.3%.

2. The spunbond method for producing non-woven fabric with deodorant feature from bamboo cellulose as claimed in claim 1, wherein the weight content of the wasted coffee residue in the prepared bamboo pulp mixture of step a is in range of 0.5-5 wt %.

3. The spunbond method for producing non-woven fabric with deodorant feature from bamboo cellulose as claimed in claim 1, wherein the concentration of dissolving solvent NMMO in step b is in range of 45-75%.

4. The spunbond method for producing non-woven fabric with deodorant feature from bamboo cellulose as claimed in claim 1, wherein the content percentage of cellulose for the dope in step b is in range of 6-15 wt %.

5. The spunbond method for producing non-woven fabric with deodorant feature from bamboo cellulose as claimed in claim 1, wherein the light transmittance index of cellulose for the dope in step b is in range of 1.470-1.495.

6. The spunbond method for producing non-woven fabric with deodorant feature from bamboo cellulose as claimed in claim 1, wherein the melting Index of cellulose for the dope in step b is in range of 100-500.

7. The spunbond method for producing non-woven fabric with deodorant feature from bamboo cellulose as claimed in claim 1, wherein the non-woven fabric of bamboo cellulose in above step d, the basis weight thereof is in range 10-300g/m2.

8. The spunbond method for producing non-woven fabric with deodorant feature from bamboo cellulose as claimed in claim 1, wherein the non-woven fabric of bamboo cellulose in above step d, the strength in machine direction (MD) thereof is over 20 kgf while the strength in cross direction (CD) thereof is over 12 kgf.

9. The spunbond method for producing non-woven fabric with deodorant feature from bamboo cellulose as claimed in claim 1, wherein the non-woven fabric of bamboo cellulose in above step d, the degree of air permeability thereof is in range of 100-3500 ($cm^3/cm^2$/min).

10. The spunbond method for producing non-woven fabric with deodorant feature from bamboo cellulose as claimed in claim 1, wherein the non-woven fabric of bamboo cellulose in above step d, the degree of water absorption thereof is in range of 500-2000%.

11. The spunbond method for producing non-woven fabric with deodorant feature from bamboo cellulose as claimed in claim 1, wherein the solvent recycling process of the NMMO, which is used in step d, comprises the following steps:
　1. bleaching by absorption of suspending active carbon by putting active carbon powder with good absorptivity and suspension ability in a percentage range of 0.05-0.10% into the liquid of NMMO solvent to be de-colored, then alternative air-blast mixing with absorption and the stationary suspending absorption treatments with treating time ratio in a range between 1:3 to 1:6 for over 8 hours to finish the bleaching procedure;
　2. filtrating by bi-phase filtration using a coarse filtering phase and fine filtering phase, wherein in the coarse filtering phase a general cartridge filter is used with a filter aid composing of diatomite and cellulose made in a diatomite to cellulose ratio of 4:1, wherein in said filter aid not only spreads over the surface of the filtering cartridge but also is put in the solution to be filtrated with content thereof in a percentage range between 0.03-0.05%, wherein a minor puffing agent is also mixed therein to enhance filtrating speed without degeneracy, and wherein after completion of the coarse filtering phase, the filtering dregs and the residual liquid are centrifugal and dehydrating treated for recycling use so that the residual auxiliary filtering agent of dehydrated filter aid is reused as an auxiliary filtering effect and wherein the fine filtering phase a ultrafiltration (UF) filter is used so that the cleanness of the filtrated liquid is the same as that of the fresh solvent;
　3. concentrating from a percentage range between 6.5-8.0% to a percentage range between 50-55% of solvent, wherein for a low yield quantity of fiber, a tri-effect condensing method is adopted to dehydrate per ton of rinsing liquid in using 0.5 ton of steam while for a high yield quantity of fiber, a Mechanical Vapor Recompression (MVR) condensing method is adopted to dehydrate per ton of rinsing liquid in using quantity range between 0.003-0.03 ton of steam, wherein the yield of condensed liquid with solvent and condensed water in both foregoing condensing methods are completely recovered for reusing, respectively, and wherein the yield of condensed liquid with solvent is recycled for reusing as processing solvent and yield condensed water is recycled for reusing to rinse fiber; and
　4. refining by adopting a temperature at 80 degree centigrade (80° C.) for a low temperature oxidation and neutralizing reduction, wherein a percentage concentration of 35% of hydrogen peroxide ($H_2O_2$) as oxidant and percentage concentration in 85% of hydrazine hydrate ($N_2H_4H_2O$) as neutralizing reductant are used, wherein the result is measured by an electric potential titrating method wherein the NMMO content is decreased down below 10 ppm so that not only the purity of NMMO is promoted but also the NMMO consumption is decreased.

12. The spunbond method for producing non-woven fabric with deodorant feature from bamboo cellulose as claimed in claim 1, wherein a concentration of the BOX additive stabilizer is between 0.05 and 0.25%.

* * * * *